United States Patent [19]
Watson et al.

[11] Patent Number: 5,117,800
[45] Date of Patent: Jun. 2, 1992

[54] OXYGEN ENRICHMENT OF FUELS

[75] Inventors: Harry C. Watson; Eric E. Milkins, both of Eltham; Geoffrey R. Rigby, Charlestown, all of Australia

[73] Assignees: The Broken Hill Proprietary Company Limited, Melbourne; The University of Melbourne, Parkville, both of Australia

[21] Appl. No.: 555,401
[22] PCT Filed: Feb. 10, 1989
[86] PCT No.: PCT/AU89/00058
§ 371 Date: Oct. 1, 1990
§ 102(e) Date: Oct. 1, 1990
[87] PCT Pub. No.: WO89/07702
PCT Pub. Date: Aug. 24, 1989

[30] Foreign Application Priority Data

Feb. 10, 1988 [AU] Australia .................. PI6683

[51] Int. Cl.⁵ .............................. F02B 13/00
[52] U.S. Cl. .................................... 123/575
[58] Field of Search ........... 123/575, 587, 1 A, 525, 123/585, 27 GE

[56] References Cited

U.S. PATENT DOCUMENTS

| | | | |
|---|---|---|---|
| 3,702,110 | 11/1972 | Hoffman et al. | 123/567 |
| 3,961,609 | 6/1976 | Gerry | 123/567 |
| 4,513,727 | 4/1985 | Lagano et al. | 123/525 |
| 4,535,728 | 8/1985 | Batchelor | 123/575 |
| 4,603,662 | 8/1986 | Norton et al. | 123/575 |
| 4,865,001 | 9/1989 | Jensen | 123/575 |

FOREIGN PATENT DOCUMENTS 1200065 9/1965 Fed. Rep. of Germany ...... 123/567
57-44762 3/1982 Japan.

OTHER PUBLICATIONS

Ghojel et al, "Effect of Oxygen Enrichment on the Performance of IDI Diesel Engines", SAE Paper No. 83024 (1983).
Quader, Combustion Science and Technology, "Exhaust Emissions and Performance of a Spark Ignition Engine Using Oxygen Enriched Intake Air", 1981 (1978).

Primary Examiner—Raymond A. Nelli
Attorney, Agent, or Firm—Nikaido, Marmelstein, Murray & Oram

[57] ABSTRACT

A method of operating a diesel or spark ignition engine which includes enriching the combustion air supply with oxygen while simultaneously adjusting the fuel injection or ignition timing of the engine to compensate for advanced combustion caused by an increased oxygen content in the conbustion air. Oxygen producing means such as an oxygen generating membrane can eliminate the requirement for, or significantly reduce the size of, an intercooler which is normally installed between a turbocharger and the air/fuel inlet of an engine. Oxygen enrichment of the combustion air permits combustion of otherwise unsuitable or difficult to combust fuels such as residual or heavy fuel oils, alcohol and alcohol blends, seed oil and blends of light gas oils and residual or heavy fuel oils.

13 Claims, 10 Drawing Sheets

OXYGEN ENRICHMENT OF FUELS

FIELD OF THE INVENTION

This invention relates to improvements in the oxygen enrichment of fuels, and particularly, but not exclusively, fuels for diesel engines. Thus, the invention is equally applicable to both diesel and spark ignition engines.

BACKGROUND OF THE INVENTION

The possibility of oxygen enrichment of diesel and spark ignition engines has been the subject of research consideration, for example, in Ghojel J, Hilliard J. C. and Levendis J. A. "Effect of oxygen enrichment on the performance and emissions of IDI diesel engines." (SAE paper 830245, 1983), and Quader A. A. "Exhaust emissions and performance of a spark ignition engine using oxygen enriched air." (Combustion Science and Technology Vol. 19, pp 81-86, 1978). These researchers found that adding oxygen to enrich the fuel used resulted in decreased exhaust hydrocarbons emissions and higher exhaust nitric oxide emissions. More importantly, the results obtained indicated that fuel consumption was not improved and in fact was poorer leading to the conclusion that oxygen enrichment was not of any significant benefit.

It is the object of the present invention to provide certain improvements in oxygen enrichment procedures by means of which material improvements may be obtained.

Heavy fuel oils are traditionally not suitable for use in most high speed diesel engines, other than marine diesel engines. The difficulty is that such fuels ignite too slowly but when ignition occurs, it burns very rapidly and therefore can seriously damage the engine. For example, fuels such as residual or heavy fuel oils, alcohol and alcohol blends, seed oils and blends of light gas oil and heavy fuel oil or coal based fuels have not been able to be used for combustion in these engines.

It is therefore another object of the present invention to provide a method and system by means of which such fuels may be used in combustion engines.

SUMMARY OF THE INVENTION

In its broadest aspect, the invention provides a method of operating a diesel or spark ignition engine, comprising the steps of enriching the combustion air supply with oxygen while at the same time adjusting the fuel injection or ignition timing of the engine sufficiently to compensate for the earlier (and improved) combustion caused by the increased oxygen content in the combustion air.

In a more specific aspect, the invention provides a system for improving fuel combustion comprising an air inlet leading to a turbocharger having a compressor, oxygen producing means connected to said compressor, and preferably to the inlet means thereof, and to the air/fuel inlet of an engine, characterized in that said oxygen producing means replaces or significantly reduces the size of the intercooler normally installed between the turbocharger and the air/fuel inlet to the engine.

Research consideration of such an arrangement has shown that fuel consumption is significantly improved by the oxygen enrichment while additional economic improvement is achieved by the removal or reduction in size of an intercooler. The findings of our research have been directly contrary to the research referred to above on the question of fuel consumption and this is believed to be due to the recognition of the need to adjust the timing of commencement of combustion of the fuel to compensate for the oxygen enrichment of the fuel.

In a preferred form of the invention, the oxygen producing means is arranged to increase the oxygen concentration of the combustion air to between about 22% and 40%, with the preferred range lying between about 24% and 28%.

The advantage of removing the intercooler lies not only in the economic consideration referred to above, but almost as importantly, in the reduction of the system volume between the compressor of the turbo charger and the engine. This leads to better transient response to demand for increased power (or torque) because there is less system volume to fill at the increased pressure and as a result the engine is far more responsive and produces less transient smoke emission.

In another aspect of the present invention, the invention provides a method of operating an engine comprising the step of enriching otherwise unsuitable or difficult to combust fuels with oxygen to such an extent as to increase the ability of the fuel to oxidise and therefore render it suitable for combustion in an engine otherwise unsuited for said fuels.

In one preferred form, the combustion air is oxygen enriched to increase the oxygen content to between about 22% and 40%, and most preferably between about 24% and 28%.

The invention also provides a system for the combustion of otherwise unsuitable or difficult to combust fuels comprising an engine, a source of oxygen or oxygen enriched air connected to the fuel/air inlet of the engine, and means for controlling the amount of oxygen added to the combustion air to increase the ability of the fuel to oxidise and render it suitable for combustion in the engine.

In a preferred form of the system, the controlling means keeps the oxygen concentration of the combustion air between about 22 and 40%, and more preferably between about 24 and 28%.

BRIEF DESCRIPTION OF THE DRAWINGS

Preferred embodiments of each of the above aspects will now be described with reference to the accompanying drawings, in which.

DESCRIPTION OF THE PREFERRED EMBODIMENTS

The chemical reaction which is an essential stage in the process commonly called "combustion" is made up jointly of chemical and physical processes, whether it be the burning of premixed fuel and air as in the spark-ignition (S.I.) engine or a combination of pre-mixed and diffusion burning processes in the diesel (C.I.) engine. The physical processes in the S.I. engine are described by the effects that heat transfer from the burned gas to the unburned gas has on the burning rate. These are influenced by both heat conduction and turbulent mixing in the flow field. In the diesel engine the process is more complicated. The fuel spray injected into the high temperature compressed air, breaks into fuel droplets which evaporate and diffuse into the surrounding air, creating a combustible mixture within the flammability limits of the fuel. This mixture burns creating a high temperature fluid into which more fuel is still being injected. The burning of this fuel is limited by the availability of oxygen in the region of the fuel stream and hence mixing plays an important role in this second stage "diffusion" combustion.

However, in every instance of combustion the fundamental chemical processes involve a chain reaction. The product (multiplication) of the local concentrations of fuel and oxygen influence the rate at which the chemical reactions proceed. It follows then that if the concentration of oxygen in the combustion air is increased and the concentration of inert nitrogen is reduced then the reaction chemistry is accelerated. This is valid for all the combustion processes in S.I. and C.I. engines and in simple flames on burners. Lewis and Von Elbe, Combustion Flames and Explosions, (Academic Press. 1961) page 382 illustrates how the maximum flame speed of hydrogen is increased by a factor of about 3.5 as the oxygen concentration is raised from 21% (normal air) to 100% (pure oxygen) in the oxidising mixture.

In the reciprocating internal combustion engine any increase in combustion rate will reduce the total elapsed time for combustion. The shorter is the combustion time the more closely it will approximate the ideal Otto cycle process (Refer Lichty, "Combustion Engine Processes" McGraw Hill 1967 p 128) and the resultant reduction in the so called "time loss" will increase the work per engine cycle, increase engine torque (and power at a given speed) and increase the thermal efficiency (reduce the specific fuel consumption) of the engine.

Hence, in the S.I. engine the increase in oxygen concentration will increase the flame speed, thus reducing combustion time. In the C.I. engine there may be only a small reduction in the time for the initiation (premixed) process when this fuel is well prepared, but if there is difficulty in breaking up the fuel into fine droplets as with heavy or more viscous fuels, then the benefit will be accentuated. In any event the diffusive combustion stage will be enhanced.

On the debit side there will be some small disbenefit in the internal combustion engine process as the faster burning leads to higher combustion temperatures, and therefore some increase in heat loss. This influence will be reduced by correct timing of the combustion event which is in any case a necessity to correctly phase the increase in pressure rise rate to maximise the work output.

It follows from the foregoing description of the combustion process that the burning rate of any fuel should be improved by increased oxygen concentration. It should be recognised that as reported by Quader A. A. in the paper referred to above, for the S.I. engine at a given power output to compensate for the improved combustion more throttling may be necessary and the thus increased pumping work can offset the gains from improved burn rate. In the diesel engine if advantage of the increased burn rate is not taken by re-optimising engine timing then again the benefit may be overlooked (Ghojel et al above).

The fuels that will give most improved performance with oxygen enrichment are those which have known difficulty in each engine type. The flame speed of methane (or methanol) which is lower than that of most hydrocarbon fuels should exhibit most response in the S.I. engine. In the diesel engine two categories of fuel will show greatest response:

a) Fuels which are difficult to prepare for burning in the diffusion stage: heavy and crude fuel oils, vegetable oils like sunflower, rapeseed and peanut.

b) Fuels which are difficult to ignite in the diesel engine such as methanol.

The test data depicted in the graphs of FIGS. 3 to 11, indicate that because of the interacting effects of changing oxygen composition on engine performance there could be a need to change the timing, and normally to change this in relation to the oxygen concentration as it is optimised for efficiency or power, in addition to any timing control functions already in the engine's timing control system which in turn may need to be reoptimised. For example from the single cylinder diesel engine results which preceded the tests depicted in the graphs of FIGS. 3 to 11, at full load 1700 r/min engine speed, 10 deg crank angle retard (i.e. later) fuel injection timing was required with the oxygen level increased to 30% by volume. The corresponding retard at 1000 r/min was 17 degrees. However, with K940 heavy fuel oil the required changes to injection timing were less, in the range of 0 to 3 degrees retard. At part load conditions less than 30% oxygen gives best efficiency. Under these circumstances injection timing needs to be retarded in the range 0 to 12 degrees. It is clear that to make best use of oxygen addition over the load and speed range there is a need to couple the prescribed optimum oxygen level with reduced injection timing advance.

It is probable that the range of timing changes including the concept of changed fuel quality as well as oxygen addition will be in the range of −5 to +25 degrees (+25 degrees is 25 degrees later ignition timing or 25 degrees retarded) in crank angle at ignition. The main defect of the work described in the Ghojel et al paper was that no attempt was made to alter the injection timing schedule to allow for the benefits from increased oxygen. At fixed timing our work is consistent with theirs in exhibiting reduced efficiency. It is also probable that the benefits found in the direct injection diesel engine are greater than those possible in the indirect injection diesel engine (IDI), where it is well known that the thermal losses associated with the air charge and combustion gas being displaced through the small connecting passage between the main chamber and the prechamber, have a considerable detriment on energy efficiency.

The work by Quader followed standard S.I. engine test practice of evaluating a mid-speed range, part load operating point well related to the sort of engine operating conditions found whilst driving vehicles in urban areas. Hence as the oxygen level was increased and the combustion improved, more throttling was needed to reduce the power back to the prescribed value. In the paper the increased pumping work is identified as well as the reduced volumetric efficiency of the throttled engine. Plainly oxygen addition at maximum power will allow more fuel to be burnt and hence the power output of the engine can be raised as with turbo or super charging. Thus the valid comparison is with engines of the same MAXIMUM power and then at the same part load condition. The engine with oxygen enrichment will be of smaller displacement and the efficiency of the engine is increased as the throttle (or rather manifold air pressure) is the same in each case.

Further efficiency increase will result as engine friction reduces with reduced engine size, other factors being equal, as exemplified by the trend for smaller engines to have lower idle fuel consumption.

It should also be noted that the efficiency can be further improved by running at the leaner mixture ratios possible with oxygen addition and thus taking advantage of the theoretical Otto cycle shift in efficiency which occurs when fuel-air mixtures change their specific heat ratio. This ratio is about 1.3 for a hydrocarbon fuel-air mixture at stoichiometric, and increases to 1.4 for a mixture with 5% fuel resulting in about 5 to 8% improvement in theoretical efficiency at usual compression ratios. This shift may produce a further 1 to 2% (absolute increase in efficiency).

At the beginning it was identified that oxygen enrichment could be optimised to enhance the ignition process as well as the diffusive burning process in the diesel engine, particularly when operating on inferior quality fuels. It is therefore probable that local enrichment around the first injected fuel in the cylinder of a large marine diesel engine could accelerate the ignition process, allow the use of a heavier fuel grade, or both. The quantity of oxygen in this oxygen stratified engine would be much less than enriching the whole charge, and also overcomes the problem that in many two stroke marine diesels a high proportion of the scavenge air is not retained in the cylinder. Bypassing costly enriched air into the exhaust would not be desirable. Admission to the cylinder would be using an auxiliary oxygen inlet valve as for example used by Sulzer in their dual fuel marine engines where boil off gas from LNG ships is employed as a fuel. In this case it may be preferable to use a higher concentration of oxygen to that used where all of the combustion air is enriched.

Figures 1, 2:
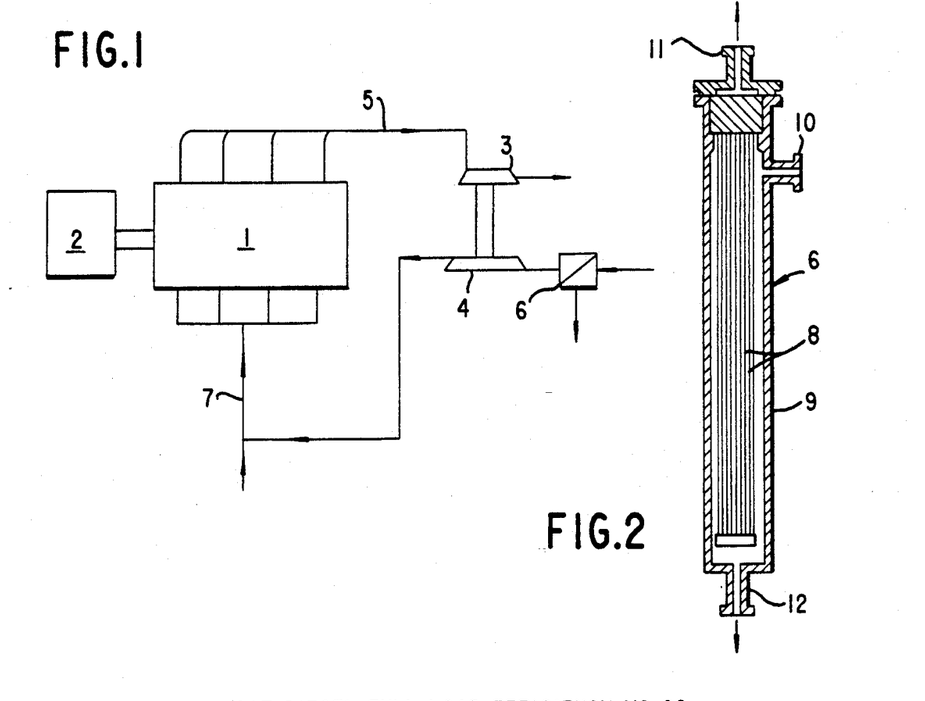
FIG. 1 is a schematic diagram showing a system for improving fuel combustion embodying the invention.
FIG. 2 is a cross sectional elevation of one form of oxygen producing membrane suitable for use with the embodiment of FIG. 1 and suitable for use with other oxygen enrichment systems embodying the invention.

Referring now to FIG. 1 of the drawings, it will be noted that the system embodying the invention includes an engine 1 driving a load 2, a turbocharger 3, having a one or two stage compressor 4, driven by the exhaust 5 of the engine 1, and an oxygen producing membrane 6 of any suitable type connected to the inlet of the compressor 4 of the turbocharger 3, the outlet of which is connected to the air/fuel inlet 7 of the engine. While the connection of the oxygen producing membrane 6 to the inlet of the compressor 4 is preferred for reasons explained more fully below, the membrane 6 may be connected to the outlet from the compressor 4.

The use of an oxygen producing membrane in either of the positions described can replace or significantly reduce the size of the intercooler which is usually positioned between the turbo charger and the air/fuel inlet of the engine, thereby providing a significant advantage over the usual turbo charged engine in addition to the advantages which are inherent in the oxygen enrichment of the fuel/air mixture.

When the membrane 6 is positioned after the compressor 4, and the membrane unit can withstand the air temperatures generated in the compressor 4, then no intercooler will be required. With some membrane materials, a small intercooler may be required to reduce the compressed air temperature to an acceptable level. However in this case, the size of the intercooler will be significantly less than that required for a conventional turbo-charged engine since a smaller proportion of the combustion air needs to be compressed to pass through the membrane (the remainder of the combustion air is naturally aspirated to mix with the oxygen enriched air from the membrane unit). This arrangement will occur with little impairment to the transient response of the engine as described above.

Where the membrane 6 is positioned on the inlet side of the compressor 4 (suction mode), as is preferred, no intercooler will be required. One particular advantage of removing the intercooler lies in the reduced system volume between the compressor of the turbo charger and the engine. This leads to better transient response to demand for increased power (or torque) because there is less system volume to fill at the increased pressure (increased pressure means more dense charge and therefore more power/torque). Similarly, less transient smoke emission is produced.

A significant additional advantage is avoiding or reducing the cost of the intercooler, which of necessity must have a large heat transfer surface area, usually a finned heat exchanger, and therefore is an expensive item.

If the membrane 6 is positioned between the compressor 4 and the engine inlet 7 (pressure mode), a two stage radial flow compressor, or a highly rated single stage compressor, may be needed to provide the required air pressure to cause air flow through the membrane. Under off-design operation, exhaust flow through the turbine may produce insufficient power to provide the optimum level of oxygen enrichment to the engine. Furthermore, as already mentioned, there may also be some need to cool the air entering the membrane if it is of a material not able to work at elevated temperatures.

When the membrane 6 is located on the suction side of the compressor 4, the compressor becomes a (radial flow) vacuum pump. Under this configuration there will always be sufficient turbine power to drive the pump because of the reduced pressure ratio and hence compression work. Further, the reduced pressure ratio results in the enriched stream delivery temperature being such that, when mixed with the normal air entering the engine, there will be no need for any inlet charge cooling. As the air entering the membrane is under atmospheric conditions there is no special requirement on membrane high temperature performance. However, the membrane 6 may need to be physically larger for the same mass flow.

With either configuration the engine may be overated as though it were turbocharged, without an increase in the air inlet density to the engine and the consequent increase in cycle temeperatures and pressures which often necessitate reduced compression ratios and other engine design changes. There will of course be some increase in cycle pressures and temperatures associated with the larger quantity of fuel burnt to produce the extra power.

One further advantage of locating the membrane 6 on the suction side of compressor 4 is that it is likely that turbochargers of the type currently fitted to diesel engine vehicles will have the capacity to draw air through the membrane cartridge 6 so that the system embodying the invention may be retro-fitted to existing installations. Where the membrane 6 is located on the outlet side of the compressor 4, some increase in turbocharger performance may be required. In either event, the selection of a suitable turbocharger for each particular application will be within the skill of the experienced diesel engineer, and further details are not required.

One embodiment of a membrane cartridge 6 which may be used to generate the oxygen enriched air for the above system is illustrated in FIG. 2 of the drawings. This membrane cartridge 6 contains a multiplicity of hollow fibre membranes 8 contained within a housing 9 having an air inlet 10, a permeate gas outlet 11 and a non-permeate gas outlet 12 cartridge. One or more of these cartridges 6 may be used as a module to generate the volume of oxygen enriched air required for the engine. In the pressure mode, compressed air enters the housing 9 through the inlet 10 and disburses along the membranes 8. Oxygen permeates through the hollow fibre membranes 8 at a very much faster rate than the nitrogen contained in the air and exits at a low pressure through the permeate outlet 11. Nitrogen takes longer to permeate the membranes and so most of it sweeps past the membrane elements 8 and exits as the non-permeate through 12. A number of the cartridges 6 shown in FIG. 2 may be connected in parallel in a modular design to provide the desired oxygen enriched air capacity.

In some membrane cartridges the inlet air is passed through the inside of the hollow fibres and the permeate containing the enriched oxygen is collected from the space around the outside of the hollow fibres. In the case of vacuum operation (section mode) the permeate is sucked through the hollow fibres.

The oxygen concentration in the permeate depends on the type of membrane design of the membrane cartridge and the operating parameters. A typical concentration for state-of-the-art polymeric membranes may be in the range 22% to 40% oxygen. Higher oxygen concentrations are possible with alternative membranes or by combining numbers of cartridges.

A number of suitable membrane cartridge designs, for both pressure and suction operation, are available commercially and the selection of a suitable cartridge would be within the skill of a person skilled in this art. Membrane cartridge designs, such as flat sheets or spiral wound sheets can be used and a suitable flat sheet membrane module is available from Matsushita Japan under the name TANA $O_2$. This membrane is suitable for vacuum operation, although it may also be used for pressure operation.

Under some circumstances, it may be preferable to use oxygen from an external source, for example from a cryogenic liquid oxygen storage tank or a pressure swing adsorption system. In this case smaller volumes of oxygen would need to be misted with the atmospheric air to provide the required combustion air oxygen concentrations (since these sources of oxygen typically have oxygen concentrations in excess of 99% by volume compared to the 25%-40% produced in the membrane system). In this case the turbine, compressor and membrane equipment would not be required.

Figure 3:
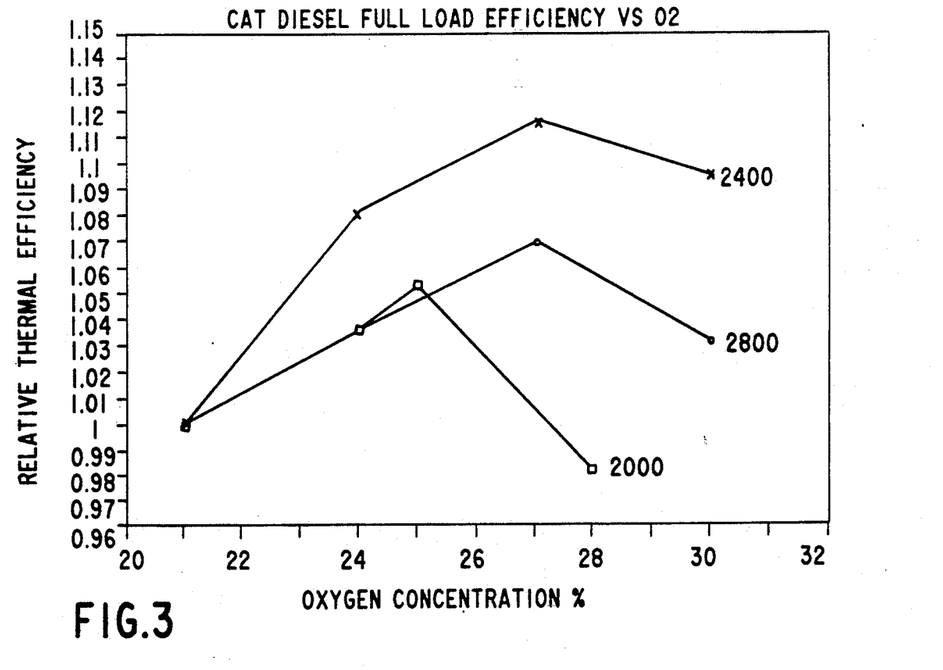
FIGS. 3 and 4 are graphs showing relative thermal efficiency and relative power for a Caterpillar V8 diesel engine modified according to the invention.
Figure 4:
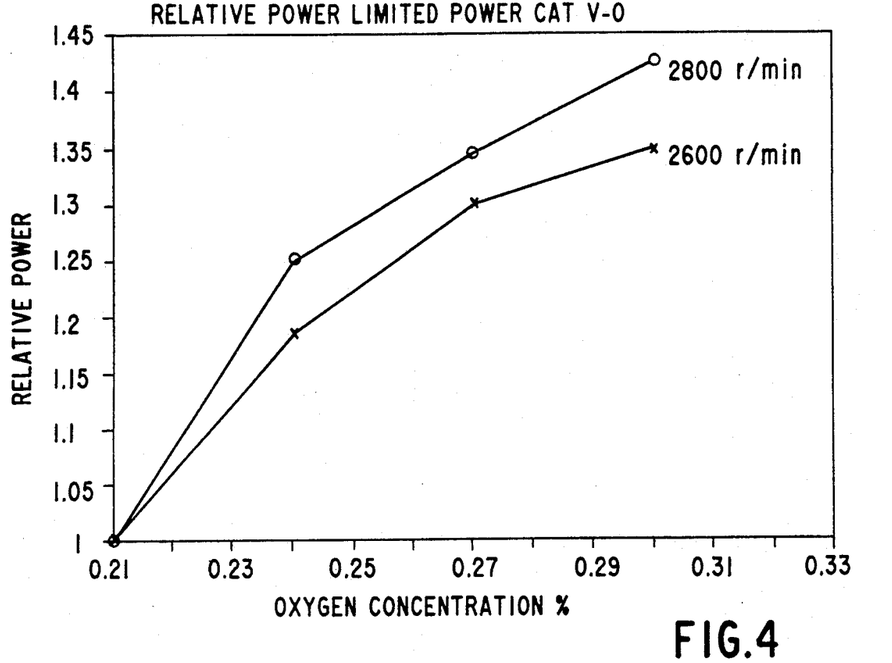

Referring now to FIGS. 3 and 4, which detail diesel engine test work performed on a Caterpillar 3208 V8 engine with a maximum power output of approximately 140 kW at 2800 r.p.m., FIG. 3 shows the relative brake thermal efficiency (referring to a base efficiency of 1.0 when using atmospheric air with an oxygen concentration of 21%) as a function of combustion air oxygen concentration for several speeds at full load. FIG. 4 shows the increase in power possible with oxygen enrichment.

In summary it can be seen that improvements in efficiency of up to 12% and in power of up to 43% have been demonstrated, which, when added to the economic advantages flowing from the intercooler size reduction or abolition referred to above, provide significant advantages to the end user.

Tests have also been conducted on the oxygen enrichment of the fuel supply to a Wakeshau ASTM Cooperative Fuel Research spark ignition engine. The results are summarized in the graphs of FIGS. 5 to 11.

FIGS. 5 to 10 are results of indicated power and indicated thermal efficiency under a range of speed and load conditions. Each graph describes results at constant manifold conditions (temperature and pressure) using propane fuel and optimum (MBT) spark timing. These results at 7:1 compression ratio are representative of those at other compression ratios away from the knock limit.

Table 1 summarises the maximum improvements in relative power and efficiency described by the graphs in FIGS. 5 to 10. Power increases of 14% and relative efficiency improvements of up to 7% are demonstrated. These efficiency improvements will be increased if a smaller engine is used to obtain the same maximum power as an engine running without oxygen enrichment. However, should the engine size not be increased, typical efficiency improvements at the given sample operating conditions are given in Table 2.

Figure 11:
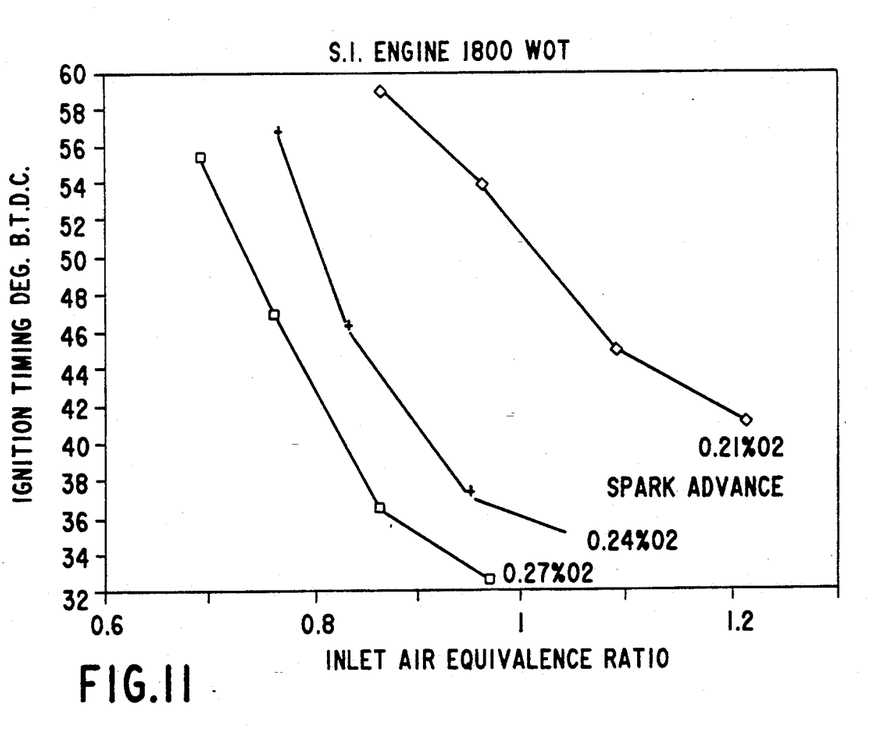
Figure 12:
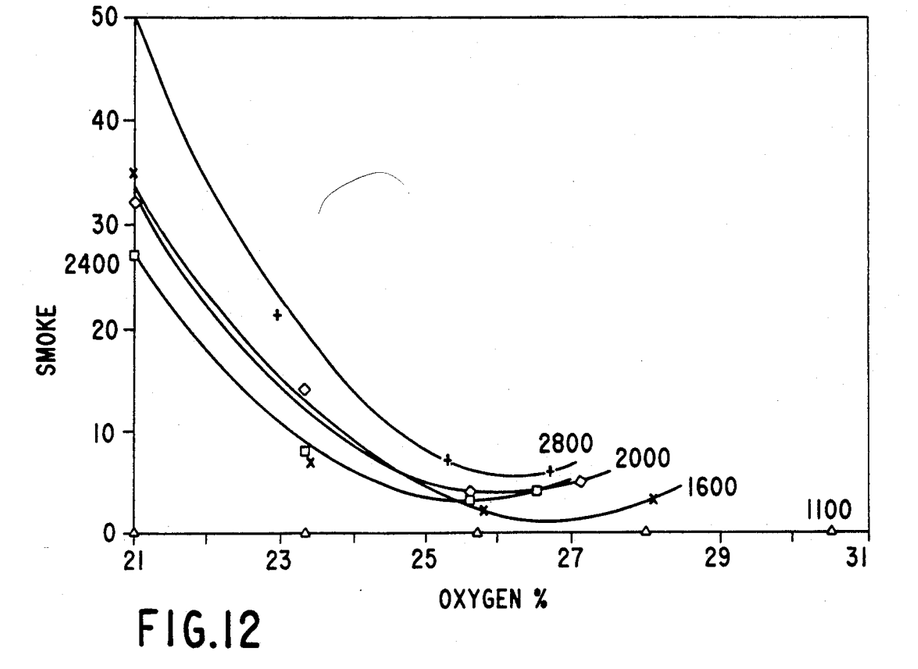
FIGS. 12 to 21 are graphs showing the effect of oxygen enrichment on the use of a heavy or residual fuel oil in the same diesel engine as used in FIGS. 3 and 4.
Figure 13:
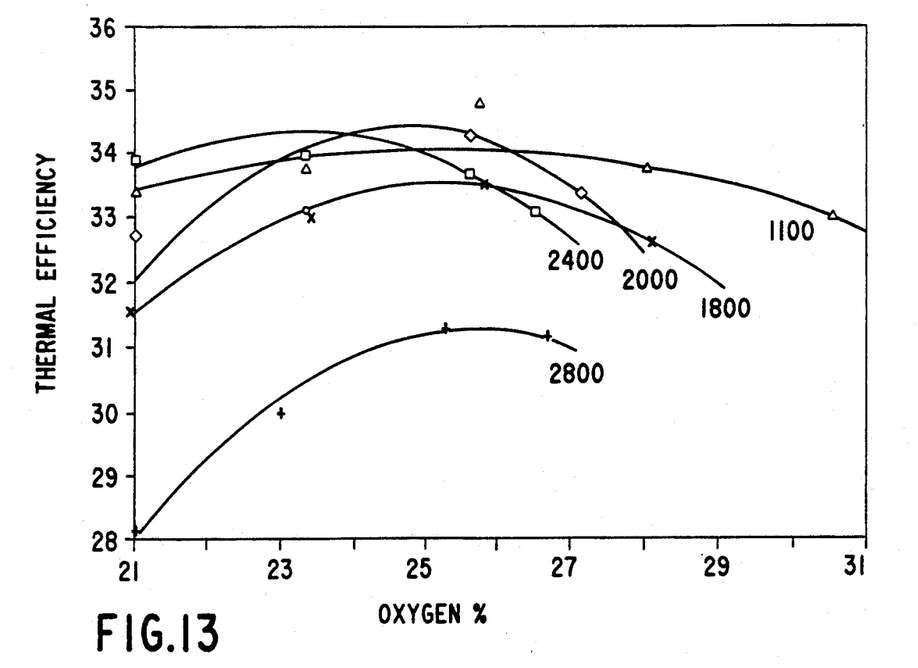

FIG. 11 is from the same CFR test series and shows typical magnitudes in ignition timing reduction associated with oxygen enrichment and the resulting improved combustion. For example at an equivalence ratio of 1.0 ignition timing is 22 degrees later (retarded).

TABLE 1

Figure 5:
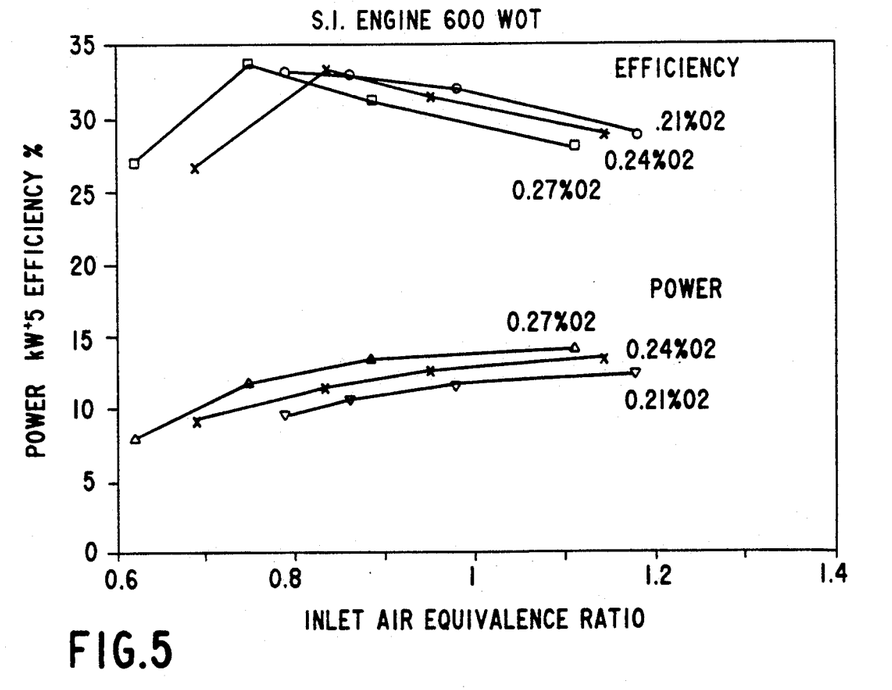
FIGS. 5 to 11 are graphs showing the effect of oxygen enrichment on the power, efficiency and ignition timing of a spark ignition engine.
Figure 6:
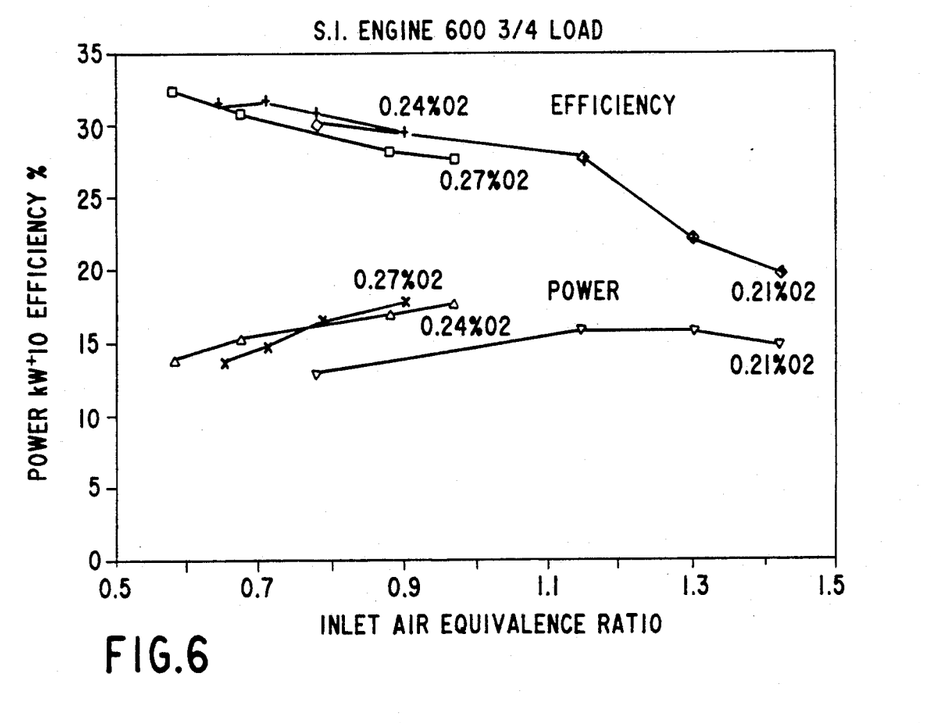
Figure 7:
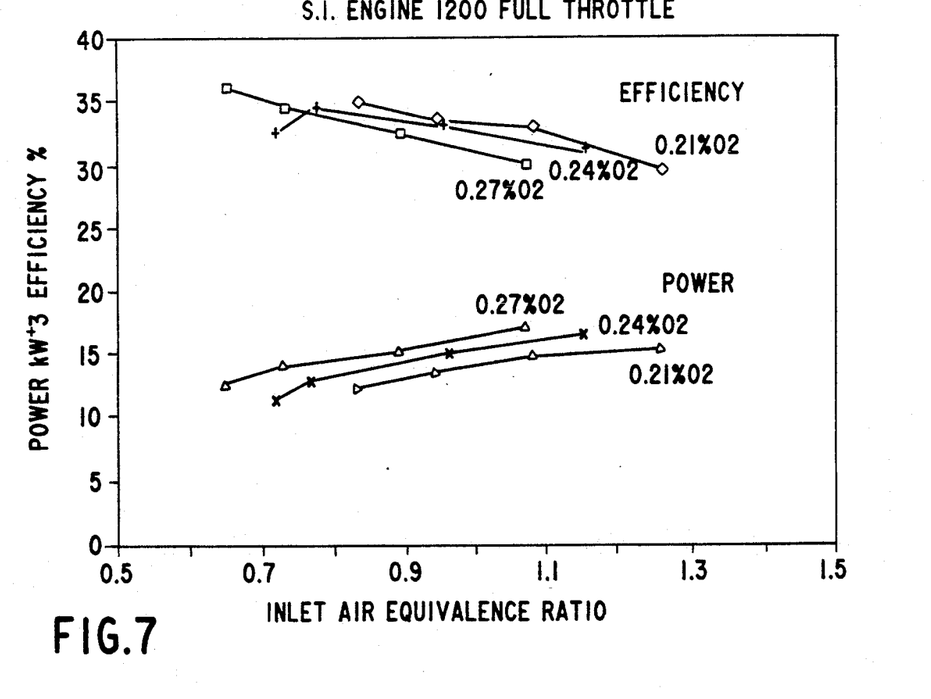
Figure 8:
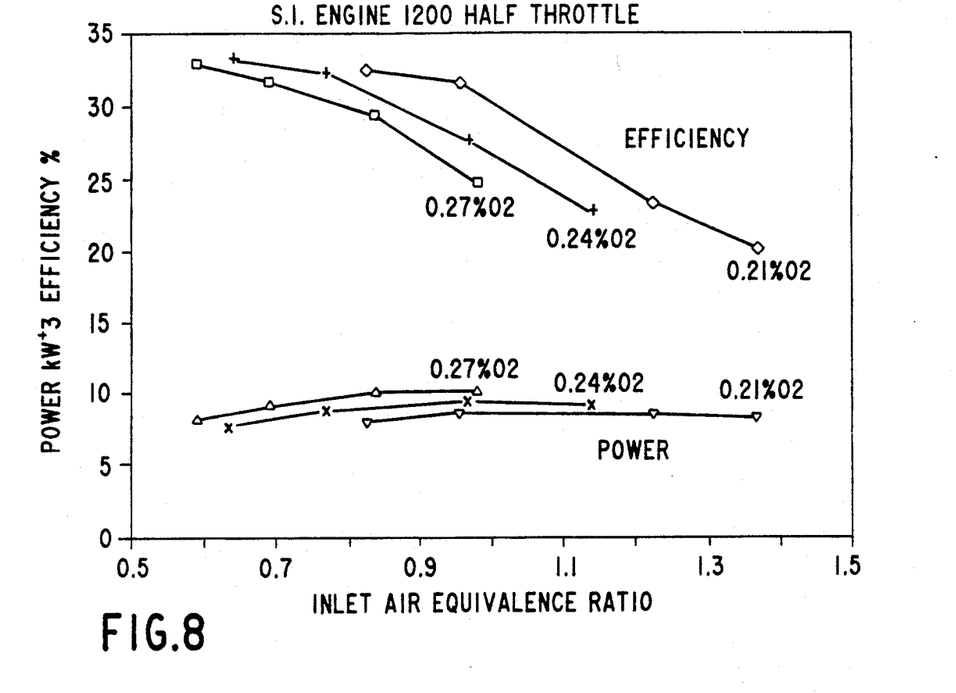
Figure 9:
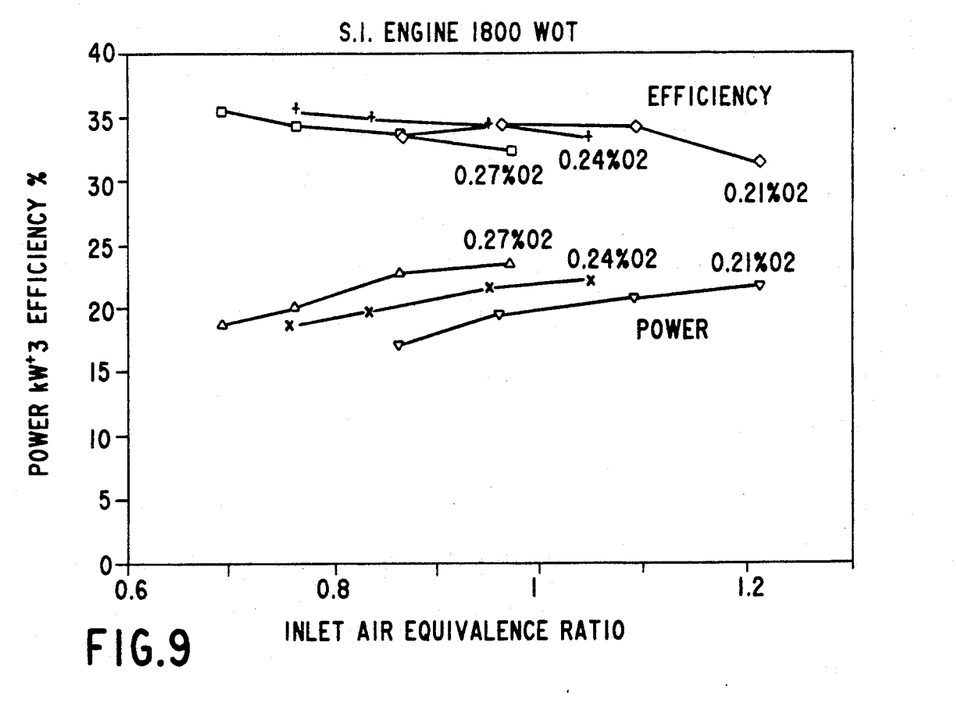
Figure 10:
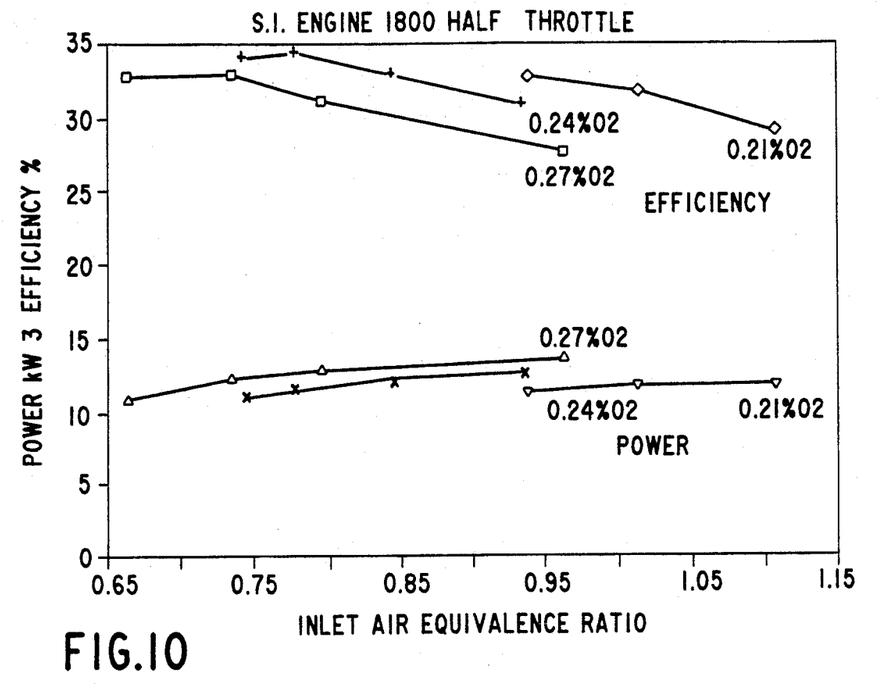

| Relative indicated efficiency and power values extracted from FIGS. 5, 6 and 7. | | | |
|---|---|---|---|
| ENGINE SPEED r/min | 600 | 1200 | 1800 |
| RELATIVE MAX. POWER 27%:21% OXYGEN | 1.14 | 1.13 | 1.10 |
| RELATIVE MAX. EFFICIENCY AT FULL LOAD | 1.02 | 1.035 | 1.03 |
| RELATIVE MAX. EFFICIENCY AT PART LOAD | 1.07 | 1.06 | 1.06 |

TABLE 2

| Relative indicated thermal afficiency at power corresponding to maximum power on air. | | | |
|---|---|---|---|
| ENGINE SPEED r/min | 600 | 1200 | 1800 |
| RELATIVE MAX. EFFICIENCY 27%:21% OXYGEN | 1.15 | 1.115 | 1.06 |

It will be appreciated from the above that the improvements in engine performance brought about by the oxygen enrichment of the combustion mixture in diesel engines may be summarized as follows:

(i) up to 30% increase in brake thermal efficiency under full load conditions.

(ii) up to about 40% increase in engine torque and power at all engine speeds when the fuelling rate is increased to produce the same smoke levels as found at full load standard conditions.

(iii) additional increases in thermal efficiency and power output when the injection timing is optimised to allow for the shorter ignition delays accompanying oxygen enrichment. At high speeds the efficiency (and torque) increases are maximised with 30% $O_2$, but at lower speeds, part load efficiency is maximized by intermediate $O_2$ addition.

(iv) reduced exhaust smoke levels under nearly all operating conditions as $O_2$ concentrations are increased.

(v) reduced maximum rates of pressure rise when the fuel injection timing is adjusted for optimum torque compared with standard operation (i.e. fixed timing and no $O_2$)

(vi) reduced HC and CO emissions by as much as 60%. However these emissions are already small with this engine except under full load conditions.

Referring now to FIGS. 12 to 21 the data represented by the graphs demonstrates for the first time the ability to use heavy or residual fuel oils, and other previously unsuitable fuels as an alternative to automotive diesel oil in a diesel engine. The oxygen enrichment of such fuels permits effective combustion in a high speed diesel engine and it will be appreciated that the ability to use cheaper fuels such as heavy fuel oil has major implications on the cost of running a wide range of such engines.

The suitability or otherwise of fuels for high performance diesel engines is not currently the subject of a relevant standard. One relevant text "Technical Data on Fuel, a Seventh Edition 1977, by Rose and Cooper, classifies diesel fuels according to cetane number, diesel index IP/21 calculated cetane index, and density, whereas light, medium and havy fuel oils are not commonly classified in this way. The most commonly used diesel fuels usually have a cetane number of 48 to 53 and a density of about 0.84, whereas fuel oils may have a cetane number as low as 30 and densities of about 0.90 to 0.97. Certainly most fuel oils and other fuels are widely recognised as being unsuitable for diesel engines. Thus, an unsuitable fuel may be defined as a fuel having a density or other characteristics which makes it unsuitable for combustion in an unmodified high speed diesel engine.

In the further test results which are detailed in the graphs of FIGS. 12 to 21, a residual fuel oil (e.g. K 940 fuel), having a density of 0.95 and a viscosity of 300 centistokes at 30° C. was delivered to a Caterpillar 3208 V8 diesel engine through fuel lines heated to about 50° C. to ensure that the fuel will flow properly with oxygen enrichments of the combustion air of between 21 and 31% by volume. The engine was found to operate smoothly, behaving similarly to normal operation with diesel fuel and producing a power output of 100 kW at 2000 r.p.m. These results indicate that fuels such as heavy or residual fuel oils, which were previously regarded as unsuitable (for high speed diesel engines), may be rendered suitable by means of oxygen enrichment.

Figure 14:
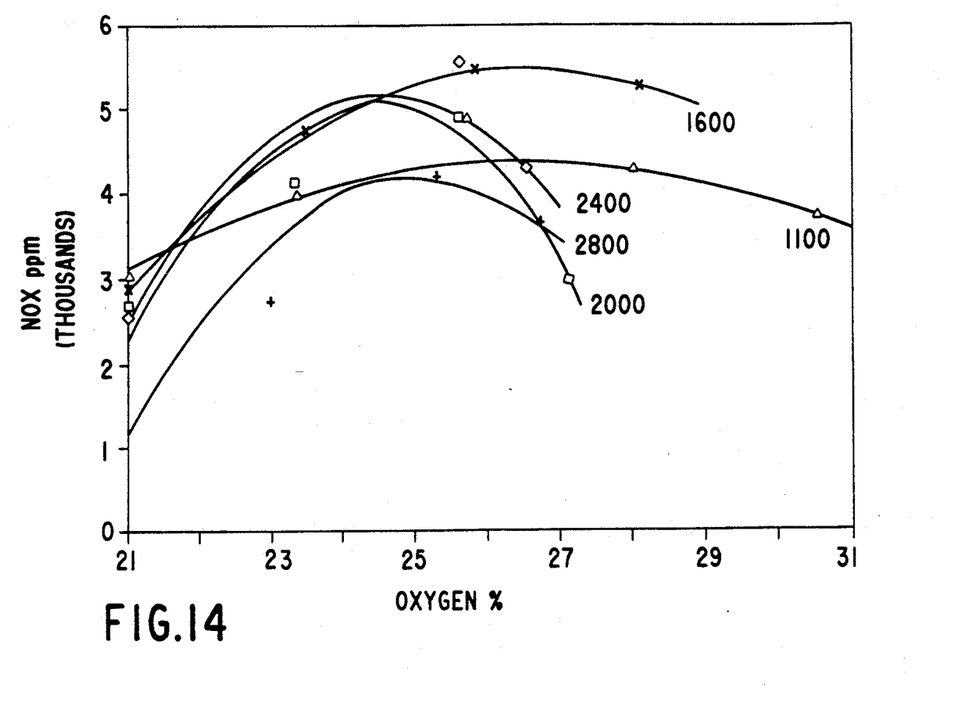

The addition of oxygen to a diesel engine charged with heavy or residual fuel oils reduces the ignition delay by 50% or more and also reduces the maximum rate of pressure rise by 20 to 50% when the injection timing is adjusted to the minimum for best torque. Associated with the more stable and improved combustion are reduced smoke levels (FIG. 12) for full load operation at the engine speeds indicated and for fixed injection timing. The corresponding increases in thermal efficiency are apparent in FIG. 13, with the largest gains being achieved at rated power speed (2800 rev./min). The NOx concentrations do increase with increasing oxygen addition, as seen in FIG. 14.

Figure 15:
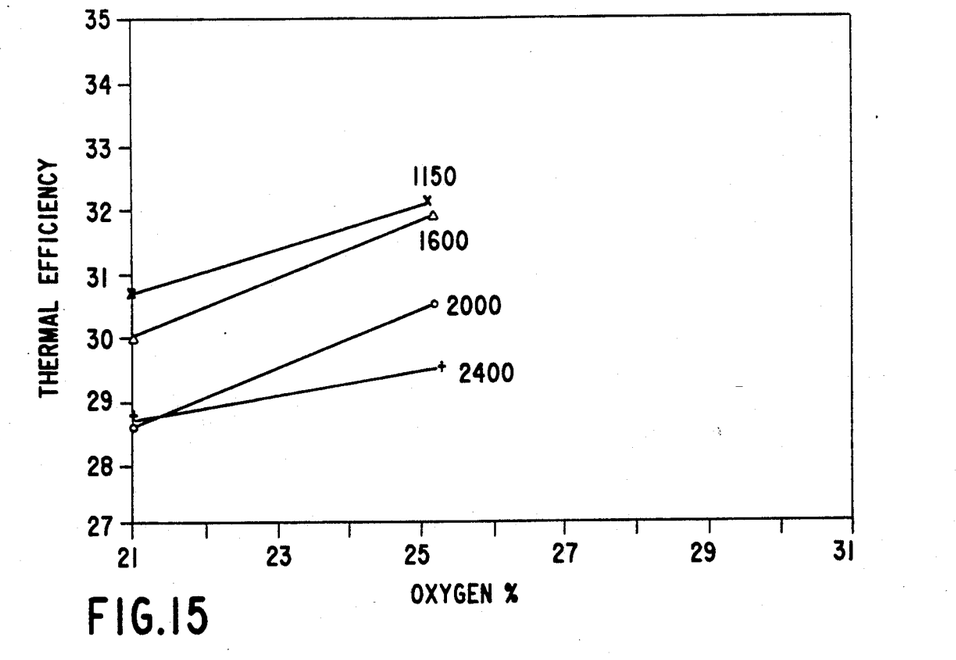
Figure 16:
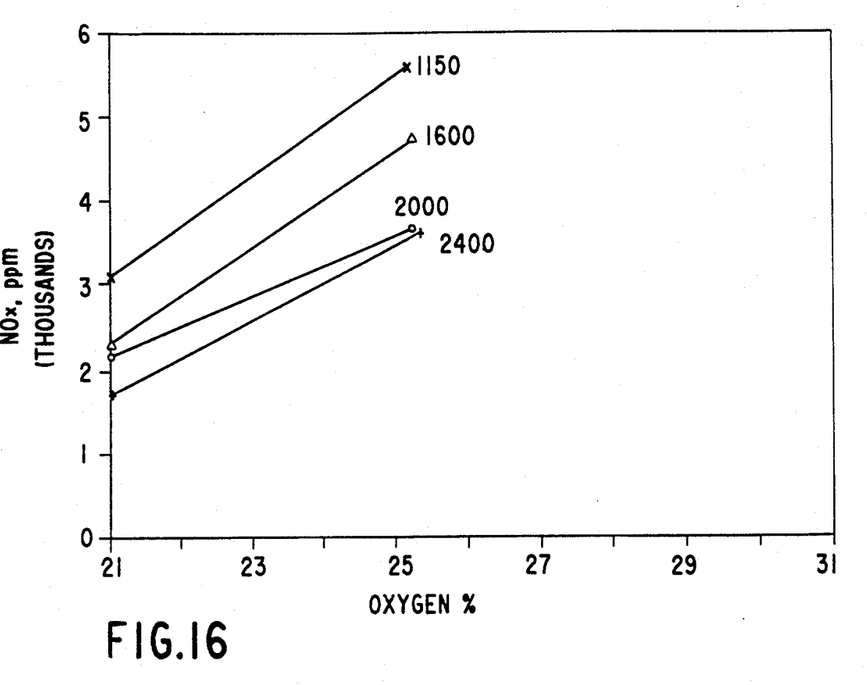
Figure 17:
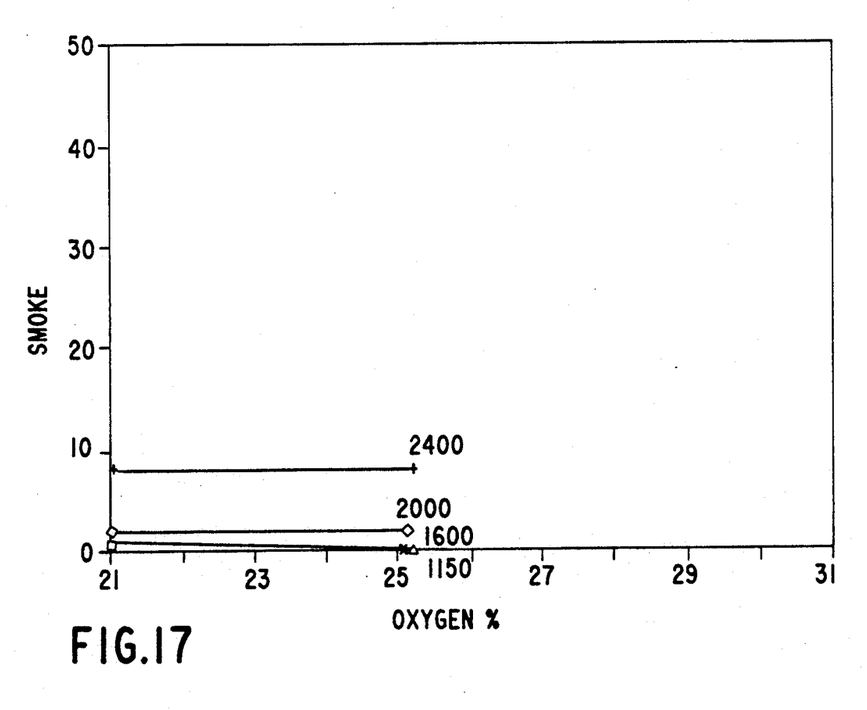

At part load, oxygen addition increases both thermal efficiency and NOx as seen in FIGS. 15 and 16, while smoke remains unchanged (see FIG. 17).

Figure 18:
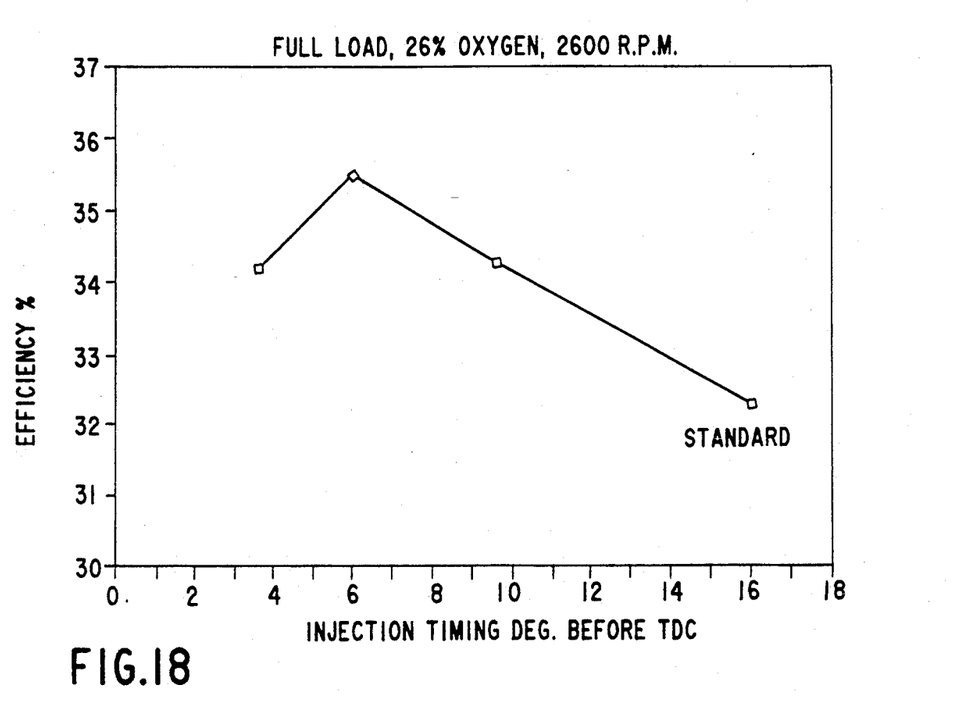
Figure 19:
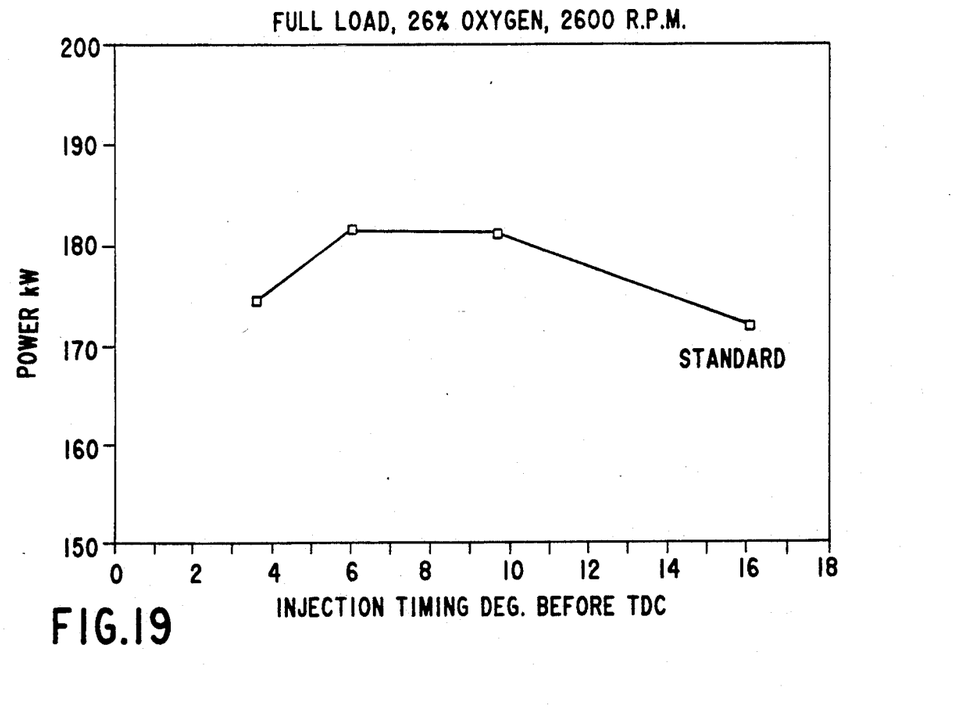
Figure 20:
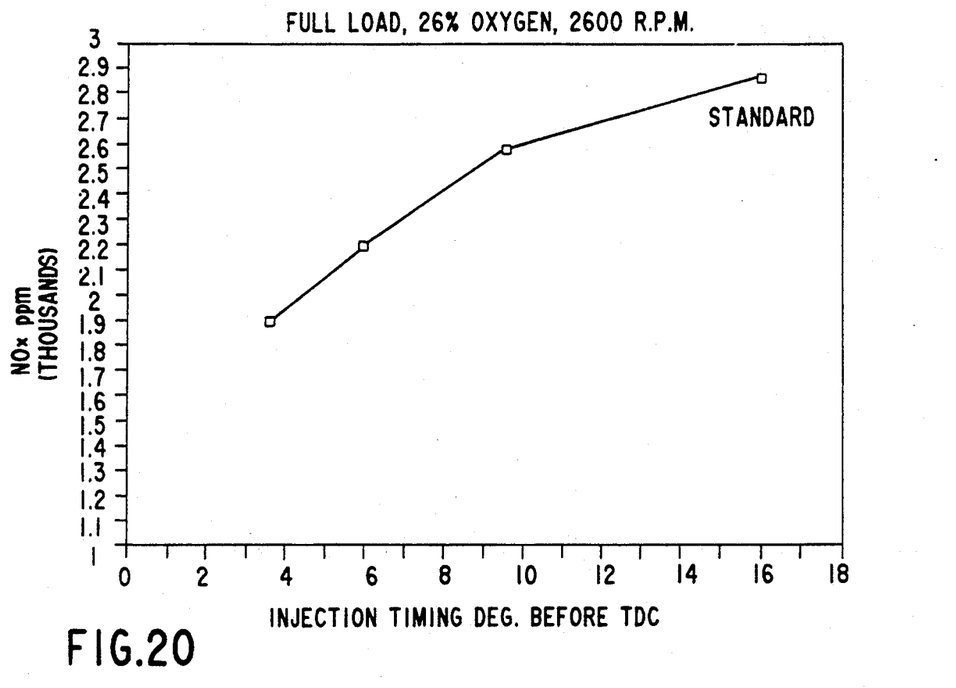
Figure 21:
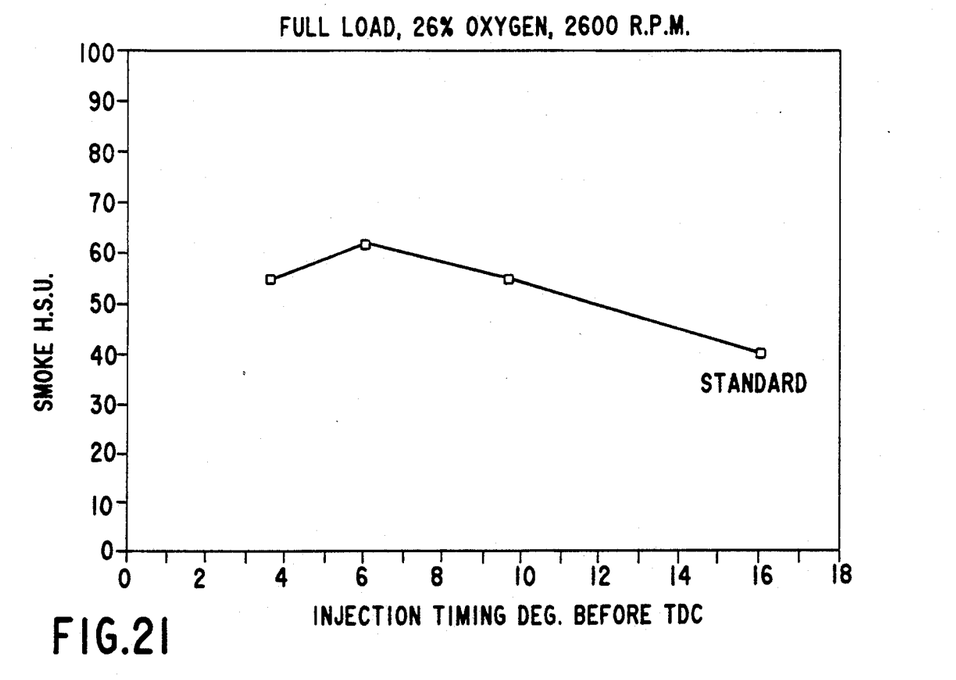

It is important in using oxygen enrichment, to recognise that the optimum injection timing is usually retarded from that of the standard engine even with heavy or residual fuel oils. FIGS. 18 and 19 demonstrate the importance of rescheduling the injection timing with power and thermal efficiency increasing by about 5 to 8% as the timing is retarded by 10 degrees. As the timing is retarded the NOx falls by 30%, but there is a slight increase in the smoke levels (FIGS. 20 and 21).

It will be evident that the use of higher density heavy or residual fuel oils requires that the fuel be maintained in a suitable liquid state by heating. Since fuel heating systems are commonly used in marine diesel applications, the adaption of such a heating system to the present invention will be within the skill of the person skilled in the art and further particulars need not be provided. Similarly, persons skilled in the art will appreciate that it is important to filter such fuels to remove any solids which may be present therein, and it is preferred that full microfiltering of the fuel be effected by the use of suitable microfilters well known in the art.

While the above description indicates how heavy or residual fuel oils may be utilised in high speed diesel engines, it will be understood that other fuels previously regarded as unsuitable for combustion in high speed engines may be more widely utilised by oxygen enriching the combustion air stream to the levels indicated above.

Thus, alcohol and alcohol blends may for example be rendered more suitable for combustion thereby avoiding the difficulties previously experienced in the combustion of such fuels.

Similarly, seed oils, blends of light gas oil and heavy fuel oil or coal based fuel may also be sufficiently enhanced to enable proper combustion in high speed engines.

With the advantages identified above, a membrane separation system involving a turbocharger/compressor as shown in FIG. 1 offers significant advantages. This system avoids the disadvantage inherent in conventional turbocharged engines of increased charge temperatures when all of the air stream entering the engine is polytropically compressed. The need for intercooling with the membrane option is reduced or eliminated. With this system the benefits of improved part load efficiency are possible without the disadvantages of conventional turbocharging such as reduced compression ratio. Relative improvements in efficiency in the range of up to 25% to 30% are possible over a normally aspirated engine.

Based on combinations of the above options coupled with a control system, it is possible to optimize and match the performance of the engine to the particular task to which the engine is applied. Such a control system based either on a mechanical or computer controlled system would optimize oxygen addition level, ignition timing and other operating parameters to optimise engine efficiency and output.

The increased efficiencies from the optimised engine, or the increased power output of an existing engine are attractive features in the market place in terms of reduced operating costs, either because of reduced fuel consumption or because of reduced capital cost for a given level of power output.

We claim:

1. A method of operating a diesel or spark ignition engine, comprising the steps of enriching the combustion air supply with oxygen while at the same time adjusting the fuel injection or ignition timing of the engine sufficiently to compensate for the earlier (and improved) combustion caused by the increased oxygen content in the combustion air.

2. The method of claim 1, wherein the step of oxygen enrichment is achieved by passing part of the combustion air supply through an oxygen producing membrane.

3. The method of claim 2, wherein said combustion air supply is turbocharged and said oxygen producing membrane is positioned at the air inlet to the compressor of the turbocharger.

4. The method of claim 1, 2 or 3, wherein said combustion air supply is enriched with oxygen to between about 22% and 40%, preferably about 24% to 28%.

5. The method of claim 4, wherein said engine is a high speed diesel engine supplied with standard quality diesel fuel.

6. The method of claim 4, wherein said engine is a high speed diesel engine supplied with fuel selected from residual or heavy fuel oils, alcohol and alcohol blends, seed oils, blends of light gas oil and residual or heavy fuel oils, and coal based fuels not otherwise suited for combustion in high speed diesel engines.

7. A system for improving fuel combustion comprising an air inlet leading to a turbocharger (3) having a compressor (4), oxygen producing means (6) connected to said compressor (4), and preferably to the inlet thereof, and to the air/fuel inlet (7) of an engine (1), characterized in that said oxygen producing means (6) replaces or significantly reduces the size of an intercooler normally installed between the turbocharger (3) and the air/fuel inlet (7) to the engine (1).

8. The system of claim 7, wherein said oxygen producing means (6) comprises an oxygen producing membrane.

9. The system of claim 8, wherein said membrane is constructed to increase the oxygen concentration of the combustion air by between about 22% and 40%, preferably about 24% to 28%.

10. The system of claim 7 or 8, wherein said engine is a high speed diesel engine and said fuel is selected from residual or heavy fuel oils, alcohol and alcohol blends, seed oils, blends of light gas oil and residual or heavy fuel oils, and coal based fuels, otherwise unsuited for combustion in a high speed diesel engine.

11. A method of operating an engine comprising the step of enriching otherwise unsuitable or difficult to combust fuels with oxygen to such an extent as to increase the ability of the fuel to oxidise and therefore render it suitable for combustion in an engine otherwise unsuited for said fuels.

12. The method of claim 11, wherein said engine is a high speed diesel engine and said fuel is selected from residual or heavy fuel oils, alcohol and alcohol blends, seed oils, blends of light gas oil and residual or heavy fuel oils, and coal based fuels, otherwise unsuited for combustion in a high speed diesel engine.

13. The method of claim 12, wherein said step of oxygen enrichment is achieved by means of an oxygen improving membrane connected to the inlet of a turbocharger fitted to a high speed diesel engine.

* * * * *